Nov. 14, 1972  I. M. SKUJA  3,702,721

FILM PROJECTION SYSTEM

Original Filed July 13, 1967

FIG__2

FIG__1

IVARS M. SKUJA
*INVENTOR.*

BY *Seed, Berry & Dowrey*

ATTORNEYS

Nov. 14, 1972 — I. M. SKUJA — 3,702,721

FILM PROJECTION SYSTEM

Original Filed July 13, 1967 — 9 Sheets-Sheet 2

FIG___3

FIG___4

IVARS M. SKUJA
INVENTOR.

BY Seed, Berry & Dowrey

ATTORNEYS

FIG_10

Nov. 14, 1972     I. M. SKUJA     3,702,721

FILM PROJECTION SYSTEM

Original Filed July 13, 1967     9 Sheets-Sheet 7

IVARS M. SKUJA
INVENTOR.

BY Seed, Berry & Dowrey

ATTORNEYS

United States Patent Office 3,702,721
Patented Nov. 14, 1972

3,702,721
FILM PROJECTION SYSTEM
Ivars M. Skuja, Seattle, Wash., assignor to Audiscan Incorporated, Bellevue, Wash.
Continuation of application Ser. No. 653,256, July 13, 1967. This application May 11, 1970, Ser. No. 37,403
Int. Cl. G03d 31/06
U.S. Cl. 353—19               6 Claims

ABSTRACT OF THE DISCLOSURE

A film projection system employing a film and sound tape cartridge adapted to be inserted along a linear path into the projector for film projection and sound reproduction. Film advance is synchronized with the sound reproduction by recorded signals on the sound tape that control the film advance actuating mechanism.

---

This application is a continuation of application Ser. No. 653,256, filed July 13, 1967, now abandoned.

This invention relates to film projection systems. More particularly, this invention relates to such systems that have a self-contained viewing or projection screen and that are adapted to accept a sound tape and film cartridge for production of an integrated audio-visual program.

Film projection systems of the above-described type are becoming increasingly popular in industry as sales and instructional aids and in schools as teaching aids. Such systems usually take the form of filmstrip projection systems vis-a-vis motion picture projection systems. Some of the existing systems of the above described type have been found to be difficult to operate effectively by the relatively technically-unskilled salesmen and teachers expected to use them the most. Difficulties are experienced in synchronizing sound and picture, often because the sound tape and film are contained in two separate cartridges. Difficulties also are experienced in aligning the cartridge film projection and sound head apertures properly in the projector for satisfactory operation, sometimes because the cartridge design necessitates complex maneuvering to properly position the cartridge within the projector. Furthermore, known cartridge-adapted projection systems employ projector-mounted film advance mechanisms that require highly accurate positioning of the cartridge within the projector to enable the mechanisms to operate without damage to the film.

THE PROJECTION SYSTEM

In brief, this invention comprises a film projection system comprising a projector and a projection cartridge adapted to present an audio-visual program. The projector and cartridge are so constructed that the cartridge is inserted into the projector endwise along a linear path to operatively couple the projector-mounted film and sound components to the cartridge-contained multi-frame film and sound tape. The projector-mounted coupling components are mounted to the projector housing in a manner such that they can be easily and accurately positioned relative to one another and relative to the position that the cartridge will take for film projection.

The preferred film projection cartridge contains a film advance image gating assembly that engages the film sprocket holes to advance the film, gate the film images during film advancement and mask the images during projection. This assembly can be employed with motion picture film and with filmstrips. When the cartridge is inserted into the projector, an actuating device is operably coupled to the assembly to effect film advance. The cartridge is adapted to contain a sound tape that may have recorded signals thereon employable by the projector to produce an integrated sound-picture program by synchronizing the film advancement with the sound reproduction.

Figure 1:
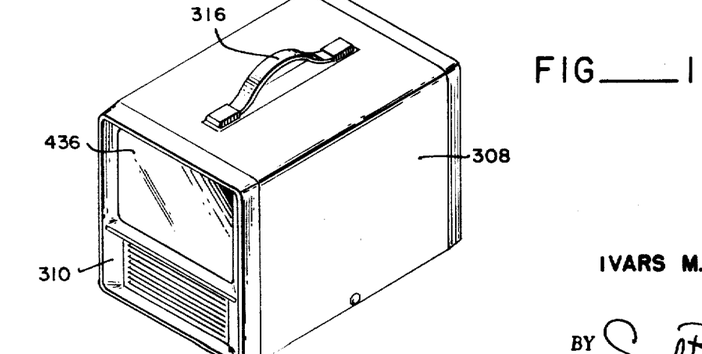
FIG. 1 is an overall front perspective of a preferred embodiment of the projector of this invention.

Referring to FIGS. 1-5, the projector housing 300 of a preferred projector of this invention is subdivided into three general sections. The rearward left hand section 302 contains the projector-mounted film and sound advance components, sound head, film illumination components, and the cartridge guideways. The rearward right hand section 304 contains the electrical control circuits. The forward section 306 contains the image reflection mirrors, the projection screen, and the sound speaker. These sections are enclosed by a removable projector housing cover 308 that fits between the front and rear ends 310 and 312 of the projector and snaps onto the sides of the projector component chassis 314. The projector handle 316 is carried by an intermediate wall or web 318 that is mounted on and extends upward from the component chassis and separates the above-referenced rearward left and right hand sections 302 and 304. The housing cover 308 is provided with a slot that fits over the handle 316 as shown in FIG. 1. The projector rear end 312 contains a cartridge insertion opening 320 leading to the projector-mounted cartridge guideways.

Referring to FIGS. 11-16, a preferred film projection cartridge 10 is shown as comprising a cartridge housing composed of a film and sound tape container 12, a film-side housing cover 14 and a tape-side housing cover 16. The container has a peripheral wall 18 and a center partition wall or web 20 that divides the container into side-by-side, wall-enclosed film and tape halves.

The forward side of the peripheral wall 18 is provided with an upper film-side image projecting aperture 38, a lower film-side actuating aperture 40, and a tape-side tape drive and sound head receiving aperture 42. The forward edge of the tape-side cover 16 is provided with a circular cutout 54 adjacent to the lower edge of the aperture to receive a projector-mounted tape drive capstan.

Figures 11, 12, 13:
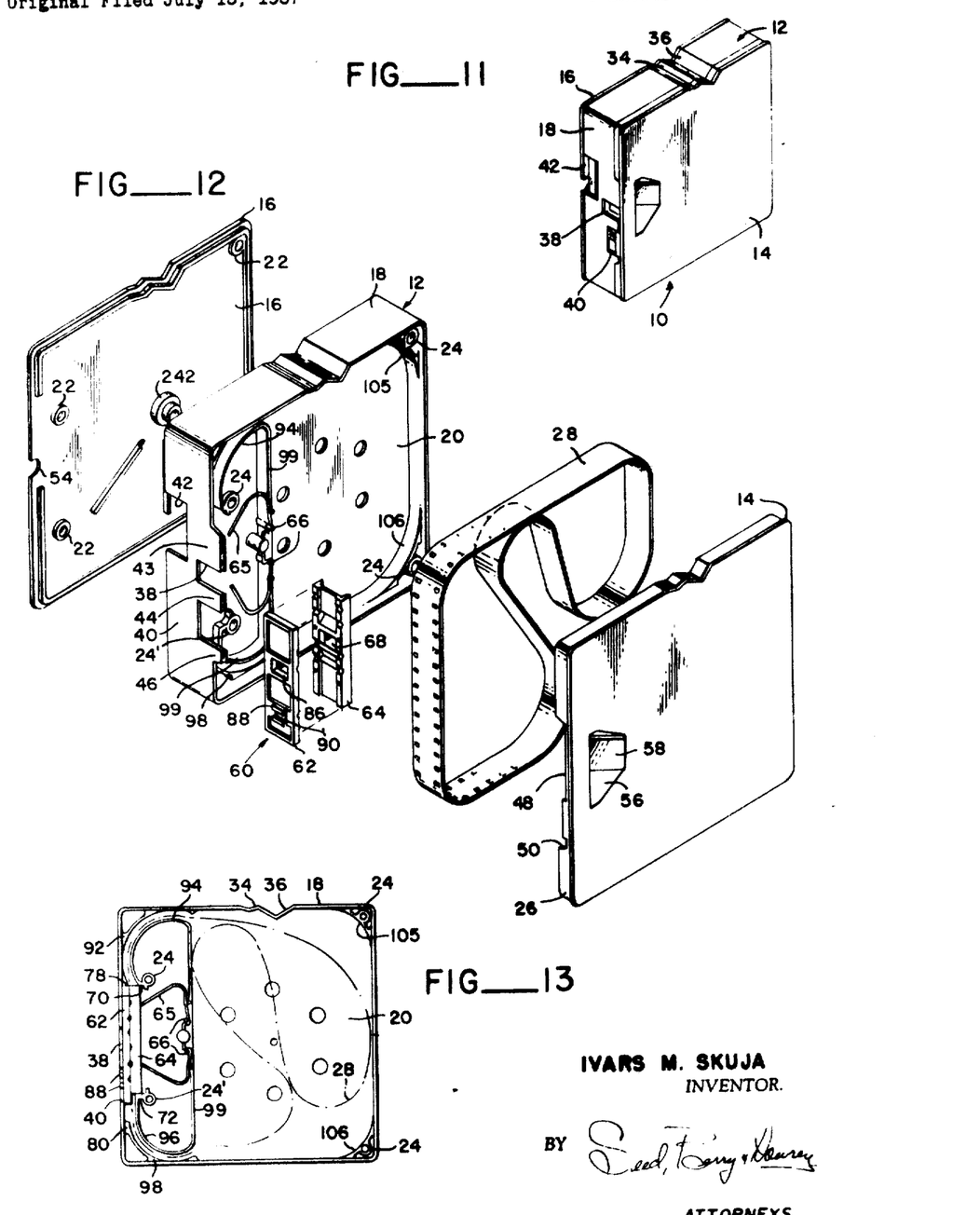
FIG. 11 is a perspective view of the film side of a preferred film projection cartridge embodiment of this invention.
FIG. 12 is an exploded assembly view of the film side of the FIG. 11 cartridge as adapted for an endless film strip.
FIG. 13 is a plan view of the film side of the FIGS. 11-12 cartridge with the film-side cartridge cover removed.

The side wall of cover 14 is provided with a recess 56 containing an opening and a reflection mirror 58 mounted therein to reflect a projection light beam (from a projector-mounted lamp) at right angles through the image projection aperture 38.

The opening created by recess 56 also permits ambient air to be circulated against the backside of the film in the gate structure to cool the film and prevent the film frames from "popping" during projection. Furthermore, such air will circulate through the film-side compartment to pre-warm the film to ambient temperature, such air being vented through holes in the web 20 into the tape-side compartment wherein it circulates and is finally vented from the cartridge through aperture 42. Circulation of ambient air to bring the film to ambient temperature will ensure satisfactory image projection and enhance future life even though a program presentation is made with cold film, as might result from transport through wintery atmosphere conditions. Circulation of air through the tape-side compartment will cause dust particles therein, for example from the graphite tape lubricant usually employed in continuous loop lubricated tape, to be exhausted through aperture 42, thereby preventing sound quality-deterioration dust build up on the tape.

A film advance and image gating assembly 60 is positioned inside of the container against the forward side of the peripheral wall 18. This assembly, described in greater detail subsequently, comprises two sections hereinafter called a "front gate" 62 and a "back gate" 64 that are of about the same width as the film and that cooperate to guidingly advance the film past the aperture 38, gate the image during film advancement, and mask the projected image. The film strip passes between the adjacent inner faces of these sections as shown in FIG. 13. The back gate has a light beam aperture 68 aligned with the cartridge aperture 38, permitting light reflected from mirror 58 to pass through the film strip 28 and out through the aperture 38. The front gate 62 is adapted to reciprocate longitudinally (i.e. parallel to the plane of aperture 38). When the front gate is in the upper position shown in FIG. 13, an image projecting aperture 86 therein is aligned with the aperture 38, permitting a film frame image to be projected through aperture 38. When the front gate is in its lower position, its aperture 86 is completely out of alignment with aperture 38 and therefore image projection through aperture 38 is gated (i.e. prevented).

The front face of the front gate has a trigger provided in the form of a pair of protruding tabs 88 with a recess 90 therebetween that extends into the front gate. These tabs extend through the actuating aperture 40 on the forward side or end of the peripheral wall 18 and reciprocate up and down as the front gate reciprocates. When the cartridge is inserted into the projector, the projector-mounted actuating mechanism will couple to the tabs 88 or the recess 90 (as by a pin extending into the recess 90). Thus as the projector-mounted actuating mechanism reciprocates upward and downward, the front gate will be reciprocated thereby advancing the film, frame-by-frame, past the cartridge aperture 38. It is emphasized that such a projector-mounted actuating mechanism does not contact the film but only couples to the trigger.

THE PROJECTOR

Referring again to FIGS. 2, 5 and 7, upper and lower cartridge guideways are provided in the form of channel members 322 and 324, aligned with the cartridge opening 320. The lower channel member 324 is attached to the chassis 314 and the upper channel member 322 is mounted to the web 318 by an angle bracket 326. The inner or forward end of the lower channel member is turned upward and provided with an adjustable cartridge stop 328. An angle member 330 is attached to the forward end of the upper channel member and cantilevered forwardly therefrom, and is provided with an adjustable cartridge stop 332 on its downwardly-extending vertical leg. The horizontal leg of the angle mounting bracket 326 is provided with transverse slots through which the upper channel member connecting bolts extend such that the upper channel member can be vertically-aligned with the lower channel member during assembly of the cartridge guideways.

Figure 2:
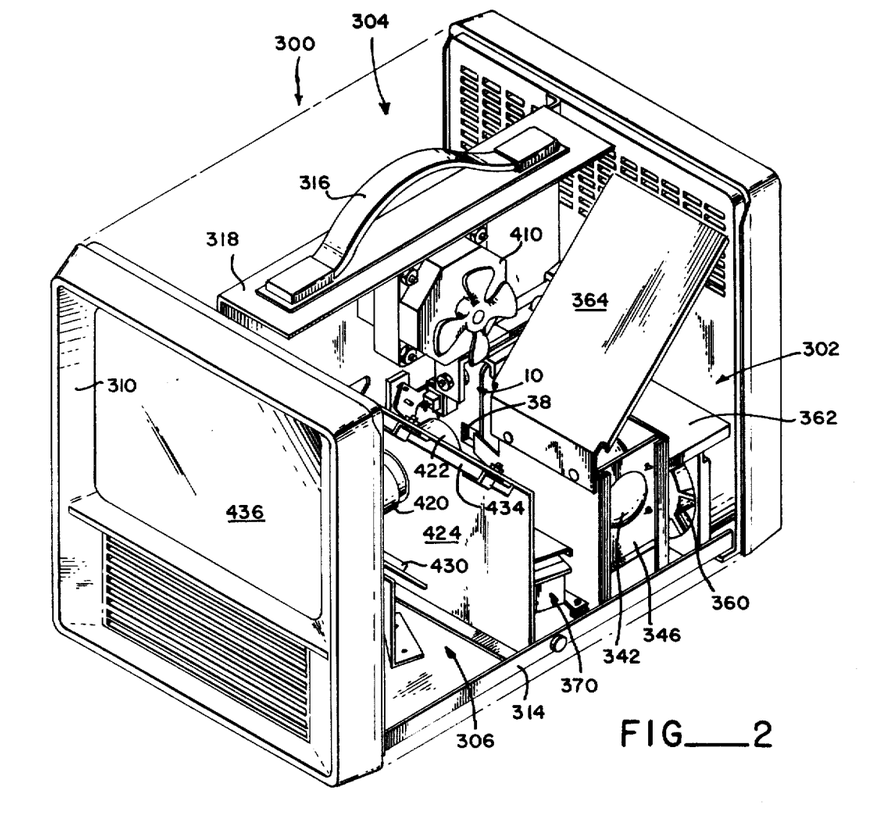
FIG. 2 is a front perspective of the projector with the projector cover removed to depict the internally-mounted components of the left hand side of the projector housing.
Figure 5:
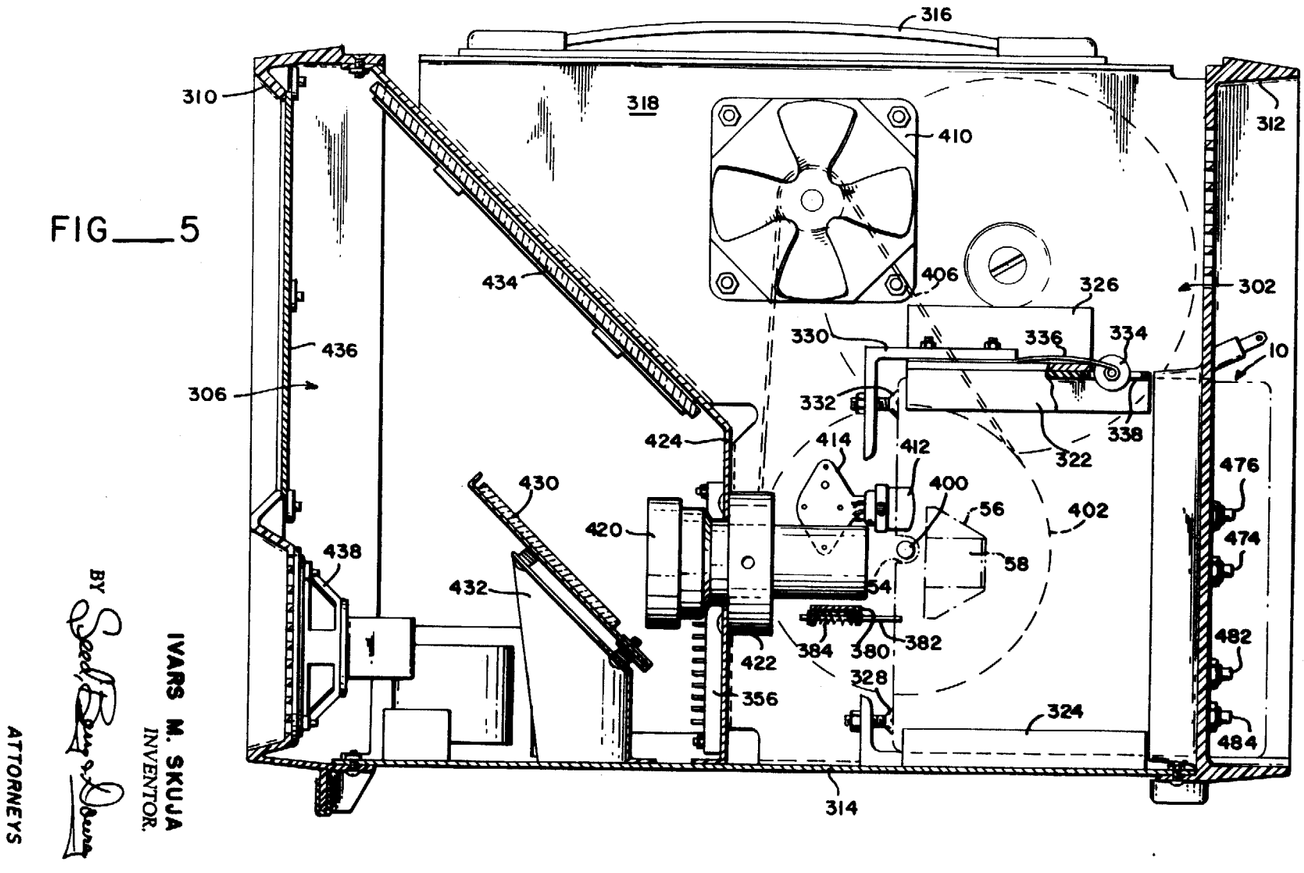
FIG. 5 is a vertical cross section of the left hand side of the projector with certain components removed for purposes of illustration.
Figures 7, 8:
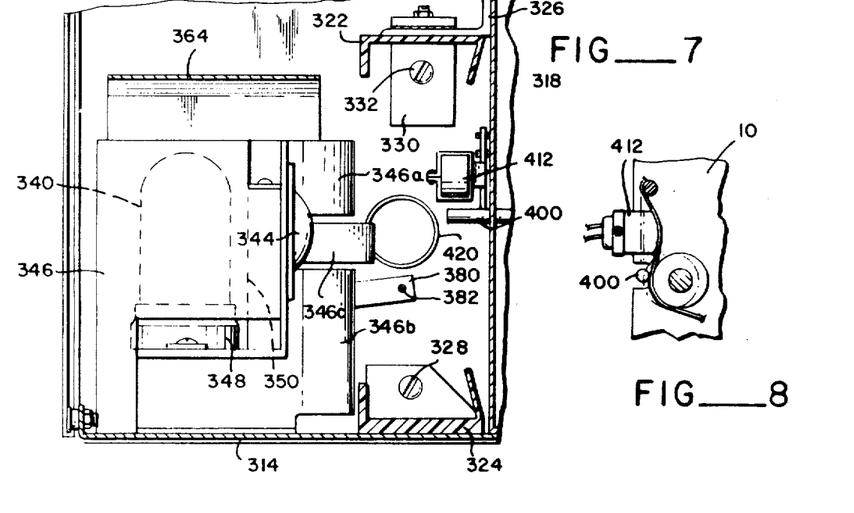
FIG. 7 is a vertical view of a section of the left hand side of the projector illustrating in elevation the illuminating and cartridge guideway components of the projector.
FIG. 8 is a detail view illustrating in elevation the interrelation of the projector-mounted sound head and sound tape drive capstan with the cartridge-contained sound tape.

A cylindrical cartridge positioning roller member 334 is rotatably mounted on the rearward end of a leaf spring 336 mounted between the angle member 330 and the mounting bracket 326 such that the roller member 330 extends through the opening 338 in the upper channel member into the upper guideway such that the roller member will ride on the upper side or end of the cartridge peripheral wall 18 when the cartridge is inserted through the projector cartridge opening 320.

Figure 6:
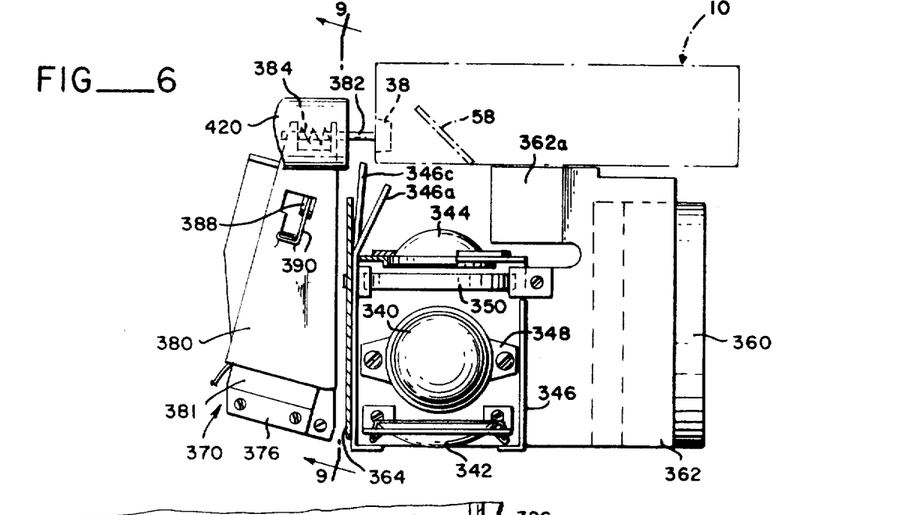
FIG. 6 is a horizontal view of a section of the left hand side of the projector illustrating in plan the illuminating and film advance components of the prjector.

Referring to FIGS. 2, 6 and 7, the film illumination components comprise a projection lamp 340, a reflector mirror 342 and a condenser lens 344 oriented perpendicularly to the cartridge guideways and aligned with the position that the cartridge mounted reflection mirror 58 will assume when the cartridge is in a film projecting position as shown in FIG. 6. The lamp is mounted in an open-top enclosure 346 that contains a base socket 348 therefor. The reflector mirror 342 is mounted in the outer wall of the enclosure and the condenser lens 344 is mounted in the inner wall of the enclosure. A heat absorbing glass 350 is mounted in the enclosure between the condenser lens and the projection lamp. A "hot mirror" in the form of a heat reflective dichroic coating that reflects infrared but lets normal light pass is applied to the lamp side of the condenser lens.

A rotary vane fan 360 is mounted in the rear end wall of the projector and is designed to force air in a clockwise direction, as viewed from the rear, forward to cool the film illumination components and the cartridge-contained film. A first baffle plate 362 extends from the rear end wall of the projector to the enclosure 346 above the fan 360 to channel the air forward. The lamp socket base of the enclosure 346 is mounted above the chassis 314 so that air will circulate thereunder. The rear wall of the enclosure 346 terminates the lamp socket 348 so that air will circulate around the projection lamp itself. The first baffle plate has a downwardly inclined tab 362a that flanks the cartridge guideway to direct the air downward and forward along the side of the cartridge and past the enclosure 346. A second baffle plate 364 extends from the top of the forward side of the enclosure 346 upward and rearward to the upper end of the projector rear end wall to direct air passing around the projection lamp out of the projector through the slotted upper section of the projector rear end wall. The forward end wall of the enclosure 346 is provided with upper and lower tabs 346a and 346b that extend rearwardly, toward the position that the cartridge mounted reflection mirror 54 will occupy when the cartridge is inserted to its projection position, to channel the air passing along the cartridge through the cartridge aperture 56 and against the rearward side of the film. The forward end wall of the enclosure 346 also is provided with an intermediate tab 346c that extends rearwardly, toward the position that the forward end of the cartridge will occupy when the cartridge is inserted to its projection position, to channel air passing along the cartridge through the cartridge image projection aperture 38 and against the forward side of the film. Thus, not only are the illumination components cooled by forced air but also both sides of the film are cooled by forced air directed against the front and back gates as the film frame images are projected to ensure that the film will not become so heated as to cause the film frames to "pop" out of focus.

Referring to FIGS. 2, 5, 6 and 9, an actuating mechanism 370, located forwardly of the enclosure 346, is mounted to the chassis 314 for coupling to the front gate trigger of the cartridge when the cartridge is inserted to its projection position within the projector. This mechanism comprises a solenoid 372 with a horizontal plunger rod 374, a bracket 376 mounting the solenoid and adapted to be attached to the chassis, a lever member 380 over the solenoid attached to the bracket 378 by a leaf spring 381 longitudinally-movably actuating pin 382 mounted at the free end of lever member 380 transversely thereof parallel with the cartridge guideway, and a coil spring 384 enclosing a section of the actuating pin 382 and urging the pin rearwardly. The bracket 376 is so located on the chassis that the rearward end section of the pin 382 will be inserted between the tabs of the cartridge front gate trigger when the cartridge is inserted into the projector to its projection position as shown in FIGS. 5 and 6.

Figure 9:
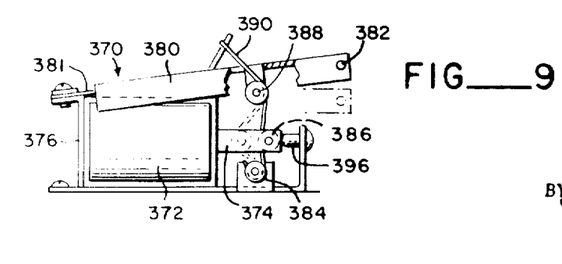
FIG. 9 is a detail view taken along the line 9—9 of FIG. 6 illustrating in elevation a projector mounted film advance component.

A lower sheave 385 is mounted on a tab upstanding from the bracket 376, an intermediate sheave 386 is journal-mounted to the free end section of the solenoid plunger rod 374, an upper sheave 388 is mounted on a tab depending from the lever member, cord 390' extends downward through an aperture 394 provided therefor in the lever member, around the outer peripheral section of the upper sheave 388, around the inner peripheral section of the intermediate sheave 386, around the outer and lower peripheral sections of the lower sheave 385, and is attached to the tab that mounts the lower sheave 385. The cord 390 is sufficiently taut and the sheaves so positioned that the solenoid plunger rod 374 is urged outward to its full extent and bears against a resilient bumper 396 mounted on bracket 376. The lever member as thus positioned places the actuating pin 382 at the elevation of the cartridge front gate trigger when the front gate is in its uppermost position with respect to the cartridge image projection aperture 38.

When the solenoid 372 is electrically activated, the plunger rod 374 will be drawn into the solenoid thereby pulling the cord 390 to the dotted line position shown in FIG. 9 and pivoting the lever member 380 down to the dotted line position shown in FIG. 9. In this position, the actuating pin 382 is at the elevation of the cartridge front gate trigger when the front gate is in its lowermost position. When the solenoid is inactivated, the plunger rod will be released and the action of the leaf spring 381, through the cord 390, will return the plunger rod and actuating pin to their original positions as shown in solid line in FIG. 9.

Referring to FIGS. 2, 3, 4, 5, 7 and 8, a sound tape drive capstan 400 is journal-mounted to web 318 and extends therethrough into the rearward left hand section 302 of the projector housing for driving contact with the cartridge-contained sound tape. A flywheel pulley 402 is fixedly mounted on the end of the capstan that protrudes into the rearward right hand section 304 of the projector housing and is rotatable, through belt 406, by the output shaft 408 of an electric drive motor 410. A two track sound head 412 is mounted in the rearward left hand section 302 of the housing by a bracket 414 to web 318 for contact with the cartridge-contained sound tape. This bracket is mounted to the web 318 by spring-loaded set screws such that the orientation of the bracket, and hence the sound head, can be adjusted (i.e. upward, downward, leftward or rightward). The sound head is confined within a circumferential ring of the bracket 414 by another set screw such that the sound head can be longitudinally positioned with respect to the bracket.

Referring to FIG. 5, a projection lens 420 is eccentrically mounted in a collar 422 and confined therein by a set screw. The collar is attached to the vertical wall of a divider 424 that separates the forward section 306 of the projector housing from the two rearward sections. The collar mounts the projection lens in general alignment with the cartridge image projection aperture 38 when the cartridge is positioned in the projector housing. The eccentricity of the lens mounting permits the lens to be rotated into exact alignment and the collar set screw permits the lens to be longitudinally positioned for proper focusing.

Referring to FIGS. 1, 2 and 5, a first image reflection mirror 430 is adjustably mounted on a stand 432 by spring-loaded screws in the forward section 306 of the projector housing for vertical reflection of images projected from the lens 420. A second reflection mirror 434 is mounted on the inclined wall of divider 424 for horizontal reflection of images from the first mirror 430 to a projection screen 436. Screen 436 is mounted on the front end wall of the projector as shown. A front-mounted speaker 438 is also mounted on the front end wall of the projector as shown.

Figure 3:
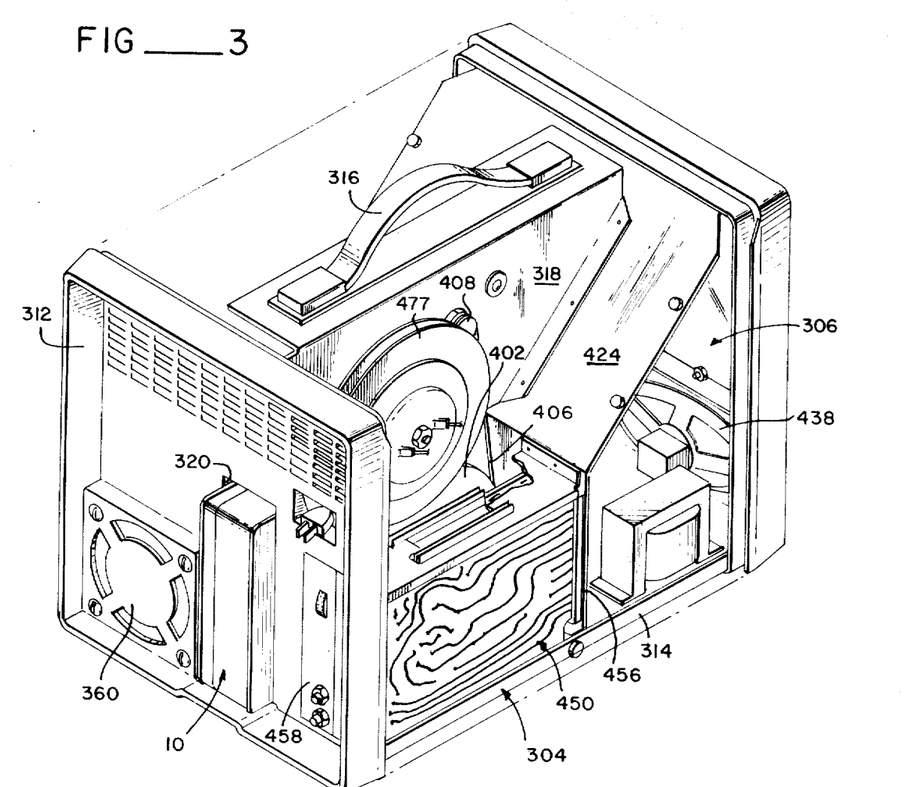
FIG. 3 is a rear perspective of the projector with the projector cover removed to depict the internally-mounted components of the right hand side of the projector housing.
Figure 4:
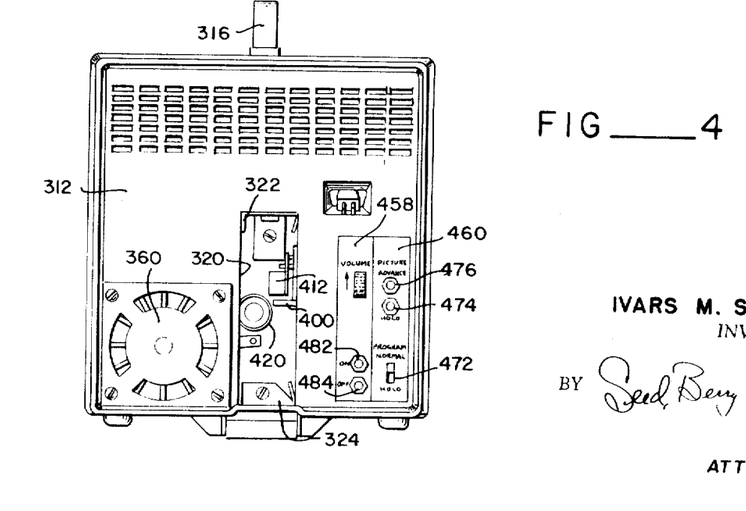
FIG. 4 is a rear view of the projector.
Figure 10:
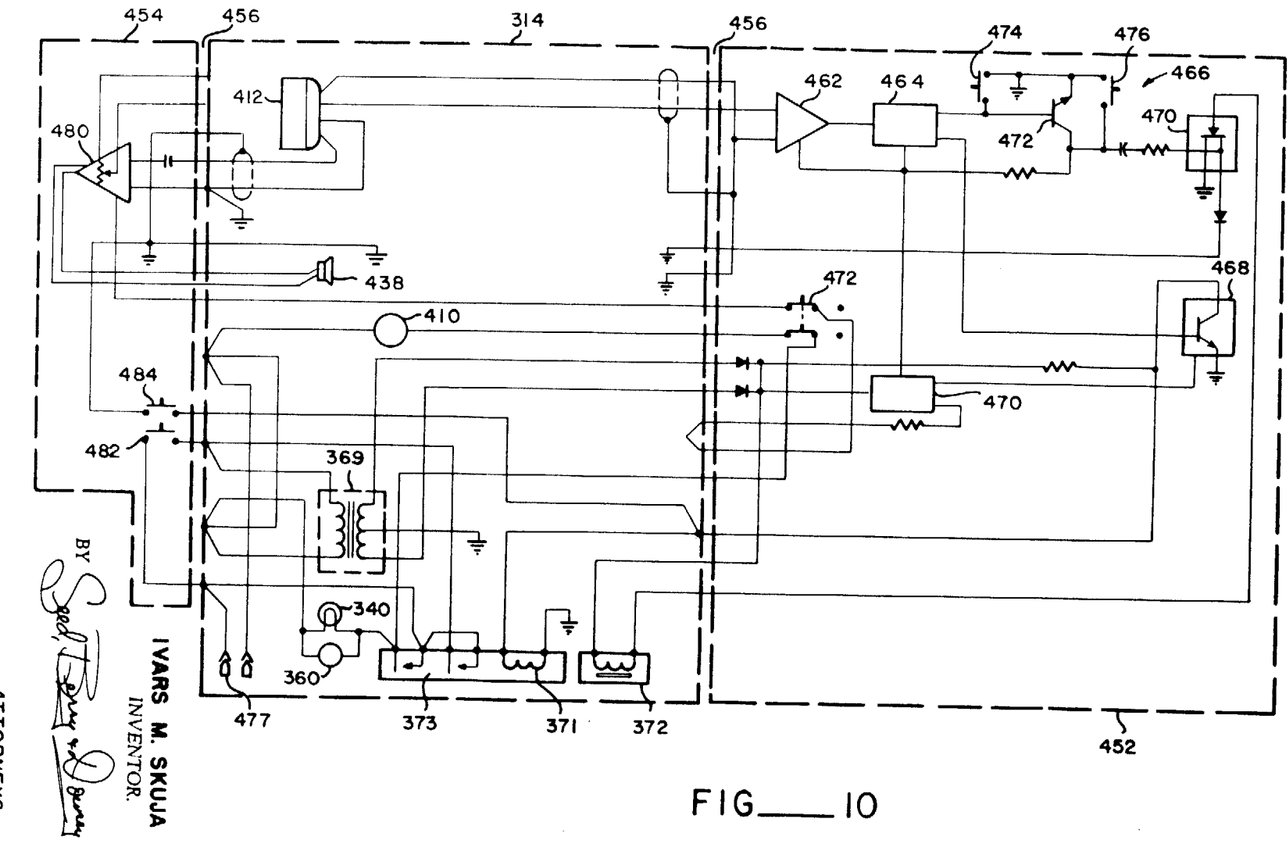
FIG. 10 is a schematic of the projector electrical circuit.

Referring to FIGS. 3, 5 and 10, an electrical circuit module 450, comprising two parallel, vertical circuit cards 452 and 454 is provided in the rearward right hand section 304 of the projector housing. The two circuit cards are individually slidably inserted through the rear end wall of the projector and between top and bottom guides into electrical engagement with one of a pair of vertical terminal strips 456 mounted by the vertical wall of the divider 424. The electrical components mounted on the projector chassis 314 are appropriately connected to the circuit cards through the terminal strips. The rearward end of each circuit card is mounted to one of a pair of back plates 458–460 that contain the necessary manually-operable controls. Circuit card 452 contains the audio-visual switching controls and the power supply for the audio and visual components. Circuit card 454 contains the audio components and the system on-off switch.

The primary sections of circuit card 452 comprise an amplifier 462, connected through the appropriate terminal to one section of the double-track sound head 412, a filter 464 for the amplifier output a film advance control switching circuit 466 connected to one of two outputs from the filter 464, a shut-off circuit 468 connected to the other output from filter 464, a circuit card power supply 470, and a two position (program "normal" and "hold"), double-pole, sound-picture control switch 472. The tape track to which the amplifier 462 is sensitive will have high and low frequency pulses recorded thereon, the low frequency pulses being filtered through to the film advance control switching circuit 466 and the high frequency pulses being filtered through to the shut-off circuit 468. The film advance control switching circuit 466 comprises a silicon controlled rectifier (SCR) 470, a p-type transistor 472 with its base connected to the filter output and its collector connected to the SCR gate and to the power supply 470. A normally-open momentary push button "hold" switch 474 connected between the transistor base and emitter and a normally-open momentary push button "advance" switch 476 connected between the transistor emitter and and collector. The principle component of the shut-off circuit 468 is a p-type transistor with its emitter grounded, with its base connected to the appropriate filter output and its collector connected through the appropriate terminal block to a chassis-mounted lock-in section 371 of power relay 373 and to a chassis-mounted power transformer 369. The contacts of one pole of sound-picture control switch 472 are connected between the card-contained power supply 470 and through the appropriate terminal blocks an amplifier 480 on circuit card 454, and the contacts of the other pole are connected through the appropriate terminal block between chassis-mounted tape drive motor 410 and power relay 373.

The primary sections of circuit card 454 comprise an amplifier 480 connected—through the appropriate terminal block—to the other section of the double track-sound head 412 and to the input of speaker 438, a momentary push button "on" switch 482, and a momentary push button "off" switch 484. The "on" switch 482 is connected through the appropriate terminal block between a chassis-mounted power cord take-up reel 477 and chassis-mounted power transformer 369 and power relay 373. The "off" switch 484 is connected through the appropriate terminal block between ground and the lock-in section 371 of power relay 373.

The primary chassis-mounted component sections comprise the two track tape head 412 with shielded output leads, the speaker 438, the tape drive motor 410, the power transformer 369, the projection lamp 340, the projection lamp cooling fan motor 360, the advance solenoid 372, and power relay 373 with its lock-in section 371.

These sections are interconnected such that depression of the "on" switch 482 actuates the power relay 373 with its lock-in section 371, the latter locking-in the former, thereby turning on the tape drive motor 410, fan motor 360, projection lamp 340, and providing power to the circuit cards 452 and 454. As the sound tape in a suitably-inserted cartridge is drawn past the sound head 412, low frequency actuating pulse signals on the film advance sound track will be picked up and amplified by amplifier 462 to actuate the SCR 470. Each pulse triggers the SCR 470 which in turn actuates the film advance solenoid 372 to advance the film in the cartridge one frame. Sound on the other sound track will be amplified by amplifier 480 and projected through speaker 438.

The end of a program is signalled by a high frequency actuating pulse signal on the film advance sound track. The signal is picked up and amplified by amplifier 462 and filtered through to actuate circuit 468 to ground the chassis-mounted lock-in section 371 of power relay 373. This grounding deactuates the power relay 373 and turns the entire system off. The same result can be effected before the end of the program by depressing "off" switch 383 to ground the lock in section 371.

If it is desired to hold the film at a particular point without affecting the sound tape, the picture "hold" switch 474 is depressed to inactivate the circuit 466, that is to say to prevent low frequency pulse signals from triggering the SCR 470. If it is desired to advance the film ahead of its normal progression without affecting the sound tape, the picture "advance" switch 476 is depressed for every frame advancement desired, each such depression serving to trigger the SCR 470. These procedures are desirable in synchronizing the sound tape and film. If it is desired to hold the film during projection while terminating sound projection, the sound-picture control switch 472 is shifted from the program "normal" position shown in FIG. 10 to its program "hold" position thereby disconnecting the tape drive motor 410 and amplifier 480 without affecting the projection lamp 340, fan motor 360 or switching circuit 466.

THE CARTRIDGE

Referring to FIGS. 11–16, the covers of cartridge 10 are adapted to be positioned against the container 12 and held in place by screws 21 that extend through bosses 22 in the tape-side cover and bosses 24–24' in the container and thread into bosses 27 in the film side cover. The combined width of the peripheral wall 18 and the lip 26 on the film-side cover is sufficient to accommodate the width of the film strip, and the width of the peripheral wall is also sufficient to accommodate the width of sound tape 30 and its storage and dispensing assembly 32. The upper side of the peripheral wall 18 of container 12 and the corresponding edge sections of covers 14–16 are notched with two parallel, transverse notches (as at 34 and 36 in FIG. 11). The forward notch 34 is shallower than the rearward notch and serves to position or index the cartridge in a cooperating projector in a stand-by or transport non-projecting condition. The rearward notch 36 serves to position or index the cartridge in a projecting condition within such a projector.

The cartridge upper film-side image projecting aperture 38, lower film-side actuating aperture, and tape-side tape drive and sound head receiving aperture 42 are closed on their respective vertical outer edges by the respective covers 14 and 16 in the assembled cartridge. The outer edges of the film half of peripheral wall 18 above aperture 38 and below aperture 40 are recessed relative to the edge sections 43, 44 and 46 immediately above aperture 38, below aperture 40 and between apertures 38 and 40, respectively, to receive lip 26 of cover 14. The edges of lip 26 are recessed at 48 and 50 to receive these protruding sections of wall 18. The aperture 38 is closed by the cover edge in the recessed lip section 48. The aperture 40 is closed and partially obstructed by a non-recessed section 52 of lip 26 between recessed lip sections 48 and 50. In the assembled condition, the apertures 38 and 40 are centered relative to the film strip edges.

Within the film-side of the container 12, a round wire spring clip 65 is positioned between retainer pins 66 and has arcuate arms that interfit into the back face of the back gate 64 to resiliently urge the assembly 60 forward. The interfit between the spring arms and the back gate is such that the back gate can move laterally rearward and forward (i.e. normal to the plane of the aperture 38) during operation of the assembly 60. Upper and lower right-angled stops 70 and 72 protrude from the web 20 to receive the adjacent edges of the back gate to restrain the back gate against longitudinal movement (i.e. movement parallel to the plane of the aperture 38) and to limit the amount of lateral movement possible against the action of spring clip 65. The forward edge of the recess 56 is aligned with the sections of stops 70–72 that are parallel to aperture 38 to also limit the amount of lateral movement of the back gate.

As positioned by stops 70–72–74–76, the back gate light beam aperture 68 is aligned with the aperture 38, permitting light reflected from mirror 58 to pass through the film strip 28 and out through the aperture 38. The dimensions of this aperture 68 are substantially the same as the dimensions of the image frame of the film strip and therefore this aperture masks the reflected light beam to the size of the film strip image frame.

The front gate 62 is adapted to reciprocate longitudinally (i.e. parallel to the plane of aperture 38) between upper and lower stops 78 and 80 that protrude from the web 20 adjacent to the peripheral wall 18. Upper front gate stop 78 is adjacent to upper back gate stop 70 but lower front gate stop 80 is below lower back gate stop 72 so as to provide the necessary longitudinal reciprocating space for the front gate. The dimensions of the front gate image projecting aperture 86 are substantially the same as the dimensions of the film strip image frame and therefore this aperture masks the projected image and limits projection to the particular frame aligned with aperture 38. When the front gate is in its lower position, where it abuts the lower stop 80, the image projecting aperture 86 is completely out of alignment with aperture 38 and therefore image projection through the aperture 38 is gated (i.e. prevented).

Arcuate film guideways are provided leading into and out of the film advance and image gating assembly 60. The upper lead-in guideway is defined by arcuate inner and outer sections 92 and 94 that protrude from the web 20. The lower lead-out guideway is defined by arcuate inner and outer sections 96 and 98 that protrude from the web 20. The arcuate inner sections 92 and 96 are interconnected by a rib 99 that also protrudes from the web 20 to serve as a barrier preventing the film strip 28 from interferring with or becoming damaged by the operating components previously described that are located forwardly of the rib 99. The side cover 14 is also provided with protruding sections 100, 101, 102, 103 and 104 that are aligned with the sections 92, 94, 96, 98 and 99 to provide guideways and a barrier acting on the opposite edge of the film strip. Upper and lower arcuate rear guides 105 and 106 in the corners of wall 18 and corresponding upper and lower arcuate rear guides in the corners of lip 26 may be provided to prevent the film strip 28 from binding in the corners of the storage space behind the barrier ribs.

With the exception of the mirror 58, the film advance and image gating assembly 60 and the spring clip 65, all of the elements referred to above are preferably molded into the cover 14 or into the container 12. Thus, assembly of the film-side of this cartridge is extremely simple and convenient, being merely the gluing of the mirror 58 in position, the insertion of the spring clip 65 and the insertion of the front and back gates 62–64. The film strip 28 is then inserted between the front and back gates, into the lead-in and lead-out guideways, and into the storage space behind the barrier ribs 99–104.

The structure of the front and back gates that accomplishes the frame-by-frame film advancement is shown in FIGS. 17–28.

Figure 19:
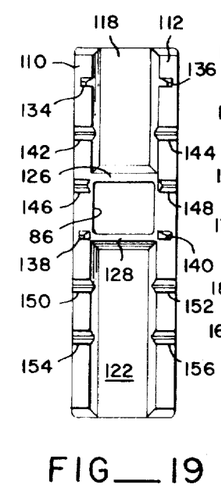
FIG. 19 is a plan view of the inner or film side face of the front gate component of the FIG. 17 assembly.
Figure 20:
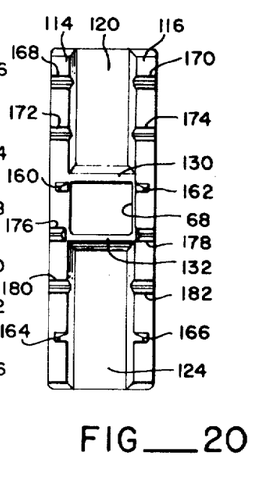
FIG. 20 is a plan view of the inner or film side of the back gate component of the FIG. 17 assembly.
Figure 21:
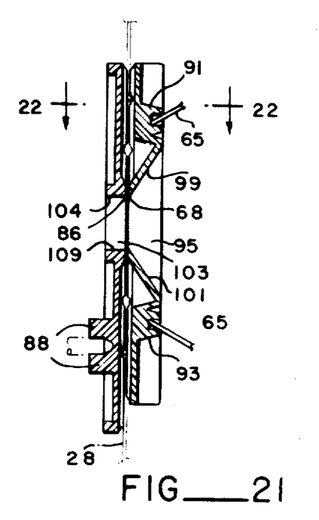
FIG. 21 is a side cross section taken along the line 21—21 of FIG. 17.
Figure 22:
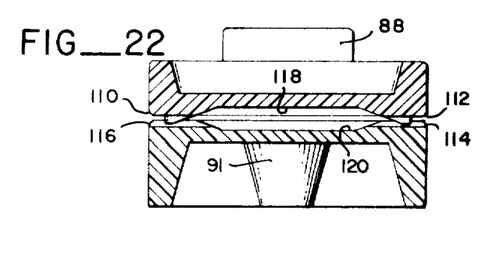
FIG. 22 is an enlarged end cross section taken along the line 22—22 of FIG. 21.

Each of the film gates, front gate 62 and back gate 64, are preferably molded from a suitable plastic to the configurations shown, with the various cross-sectional thickness designed to prevent warpage resulting from molding. The adjacent inner surfaces of each gate are provided with a set of two parallel side rails, 110–112 for the front gate 114–116 for the back gate, which have flat surfaces that are of a width approximately equal to the non-image containing side sections of the film that contain the rectangular film sprocket holes or slots. In between the side rails of each gate, the inner web surfaces thereof are recessed above (at 118 for the front gate and at 120 for the back gate) and below (at 122 for the front gate and at 124 for the back gate) the respective aperture, 86 or 68, with sloping transition surfaces therebetween as shown in FIGS. 19, 20 and 22. Each respective aperture, 86 or 68, is bounded on the inner face of its gate by the respective side rails and by upper and lower sections, 126–128 for the front gate and 130–132 for the back gate, that extend between the respective side rails. The inner faces of the sections 126–128–130 are flush with the faces of their respective side rails. The top and bottom ends of each side rail are tapered outward and away from the adjacent gate as shown in FIGS. 9–11.

Figure 18:
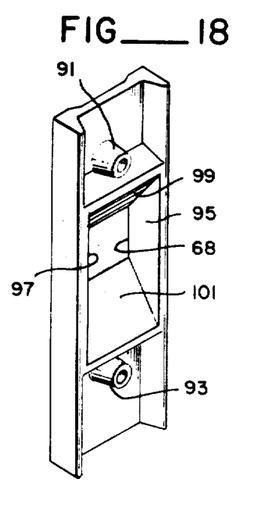
FIG. 18 is a perspective view of the rear or outer side of the back gate component of the FIG. 17 assembly.

The outer rearward surface of the back gate is provided with upper and lower hollow conical protrusions 91 and 93 that receive the ends of the arcuate arms of spring 65. The back gate is also provided with relatively sharply inclined side walls 95 and 97 that slope inwardly to the plane of aperture 68 and less sharply-inclined upper and lower walls 99 and 101 that also slope inwardly to the plane of aperture 68.

Figures 17, 23:
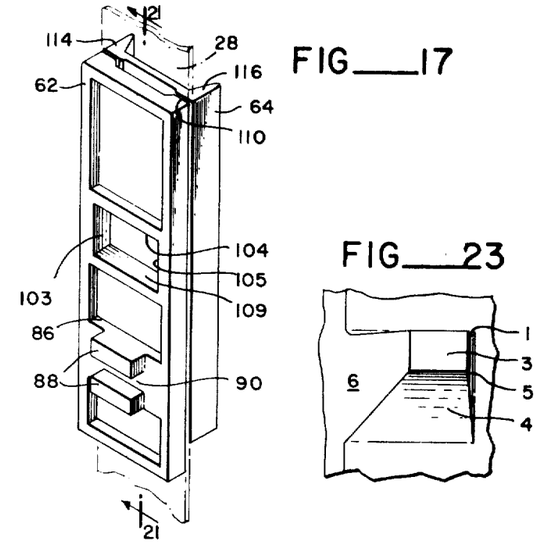
FIG. 17 is a perspective view of a preferred film advance and image gating assembly for use with the cartridge of the invention.
FIG. 23 is an enlarged detail plan view of one of the gate components illustrating a typical film sprocket hole engaging element of such gate component.

The front gate is provided with relatively sharply inclined side and upper and lower top walls 103–105 and 104–109 that slope inwardly to the plane of aperture 86.

The front gate is provided with an upper and a lower section of film sprocket hole-engaging teeth, each set comprising two teeth 134–136 and 138–140 that are positioned opposite one another, with one tooth on each side rail as shown in FIG. 19, and that protrude outwardly from the flat surface of their respective side rails. The teeth of the lower set flank the lower edge of the aperture 86 and the teeth of the upper set are positioned on their respective side rail about ¾ of the distance toward the upper end from the lower set. Two sets of transverse grooves or notches are positioned equidistant between one another and between the upper and lower sets of teeth, each set comprising two grooves 142–144 and 146–148 that are positioned opposite one another, with one groove on each side rail as shown in FIG. 19, and that are formed in the flat surface of their respective side rail. Two additional sets of transverse grooves or notches also are positioned equi-distant between one another below the lower set of teeth, each such set comprising two grooves 150–152 and 154–156 positioned opposite one another, with one groove on each side rail as shown in FIG. 19. The spacing between the adjacent teeth and grooves on each rail are equal to the spacing between the film sprocket holes.

The back is also provided with upper and lower sets of film sprocket hole-engaging teeth, each set comprising two teeth 160–162 and 164–166 that are positioned opposite one another, with one tooth on each side rail as shown in FIG. 20, and that protrude outwardly from the flat surface of their respective side rail. The teeth of the upper set flank the upper edge of the aperture 68 and the teeth of the lower set are positioned on their respective side rail about ¾ of the distance toward the lower end from the upper set. Two sets of transverse grooves or notches are positioned equi-distant between one another above the upper set of teeth, each set comprising two grooves 168–170 and 172–174 that are positioned opposite one another, with one groove on each side rail as shown in FIG. 20, and that are formed in the flat surface of their respective side rail. Two additional sets of transverse grooves also are positioned equidistant between one another and between the upper and lower sets of teeth, each such set comprising two grooves 176–178 and 180–182 positioned opposite one another, with one groove on each side rail as shown in FIG. 20. The spacing between the adjacent teeth and grooves on each rail are equal to the spacing between the film sprocket holes.

It is apparent from FIGS. 19–22 that, when the apertures 86 and 68 are aligned with the gates in operable face-to-face adjacency, the teeth on each rail surface protrude into grooves on the opposite gate. Thus, teeth 138–140 and 134–136 on the front gate will protrude into grooves 176–178 and 168–170, respectively, on the back gate. Likewise, teeth 160–162 and 164–166 on the back gate will protrude into grooves 146–148 and 154–156 on the front gate.

Figure 25:
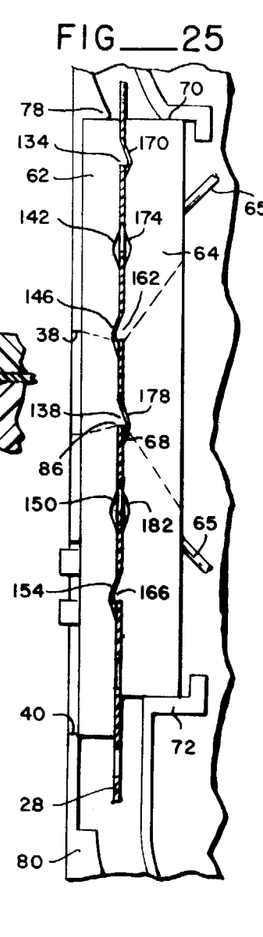
FIGS. 25-28 are partially-schematic elevation views showing, in sequence, the operation of the FIG. 17 assembly through one film advance cycle.

The operating sequence of the front and back gates is illustrated in FIGS. 25–28. FIG. 25 shows the apertures 86 and 68 aligned and the film contained between the gates by the teeth protruding through the film sprocket holes into the respective grooves. In this configuration, the frame held between the gates for projection of its image is confined on the sides by the adjacent sections of the side rails 110–112–114–116 and is confined on the top and bottom by the sections 126–128–130–132 extending between the respective side rails. Thus, this frame is properly positioned and aligned with respect to the apertures 86 and 68 for projection.

When the front gate is moved downwardly (FIG. 26) the teeth will ride out of their respective grooves, the back gate being moved rearwardly against the action of the arcuate arms of spring 65. The front gate teeth will remain inserted through the film sprocket holes and the film will be advanced with the front gate. The back gate teeth now contact the film between the film sprocket holes to maintain the film against the front gate and retained by the front gate teeth. It will be noted that as the front gate aperture is moved downwardly, the projected image will also move downward out of alignment with the cartridge aperture 38, but that the "next image frame" being advanced into alignment with cartridge aperture 38, will not be projectable because the solid front gate section above aperture 86 will move into alignment with cartridge aperture 38 along with the next image frame.

When the film has been advanced one frame (FIG. 27), the teeth will protrude into the now adjacent grooves, the back gate will move forwardly under the action of spring 65, and the film will be confined as in FIG. 25, except that apertures 86 and 68 will be completely out of alignment so that no image projection can occur.

When the front gate is advanced upward (FIG. 28), the teeth will again ride out of registry with the grooves, the back gate being moved rearwardly against the action of spring 65. The back gate teeth will remain inserted through the film sprocket holes and the film held stationary with the back gate. The front gate teeth now contact the film between the film sprocket holes to maintain the film against the back gate and retained by the back gate teeth. As the front gate aperture 86 moves into alignment with the cartridge aperture 38, the previously-referenced "next-image frame," or "newly-advanced frame," will be progressively exposed for projection.

When the front gate returns to its FIG. 25 position, the teeth will protrude into the adjacent grooves and the back gate will move forward under the action of spring 65 to shift the "next image frame" into its proper projection plane. The apertures 86 and 68 again will be aligned for image projection of the "newly-advanced frame."

The teeth preferably are adapted to closely fit the film sprocket holes. They have an acute leading edge rake angle such that the leading edges of the teeth are inclined in the direction of film advance and an obtuse trailing edge rake angle such that the trailing edges of the teeth are also inclined in the direction of film advance. Thus, the film is carried by the leading edges of the front gate teeth when the front gate advances the film one frame, and the film sprocket holes previously overlying the back gate teeth are drawn from the back gate teeth over the trailing edges of such teeth. When the front gate returns to its image projection position after having advanced the film one frame, the film is retained against the leading edges of the back gate teeth, and the front gate teeth, previously inserted through the film sprocket holes, are drawn out of the socket holes.

Figure 24:
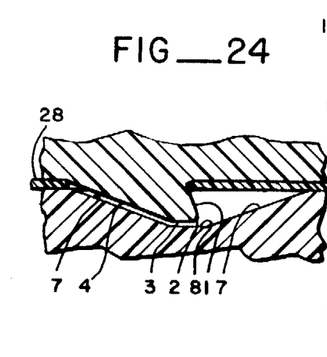
FIG. 24 is an enlarged side detail view in cross-section of the front and back gate components illustrating the film engaging interaction between the two components.

All of the teeth are preferably identical and have the structure shown in FIGS. 23 and 24. Each tooth has an inclined leading edge 1 with an acute, or a positive, rake angle as shown in FIG. 24, a round leading tip 2, a rectangular flat end 3, an inclined trailing edge 4 with an obtuse, or negative rake angle as shown in FIG. 24, a relatively sharply-inclined outer side edge 5, and a less sharply-inclined inner side edge 6. The steepness of the outer side edges facilitate the alignment and positioning of the film on the teeth both during and between periods of film advancement. The slope of edges 6 is preferably the same as the transition surface between the side rail, from which the tooth protrudes, and the recessed surface between the side rails. The edges 6 are thus extensions of such transition surfaces, the more gradual slope of which facilitate insertion and removal of the film between the gates in that the film edges are not damaged by traverse of these side edges. The flatness of the ends reduces film abrasion due to relative movement between the teeth and the film as the film is advanced. The positive rake angle of the leading edges facilitates retention of the film on the proper teeth. The negative rake angle of the trailing edges facilitates withdrawal of those teeth on which the film is not to be retained during the film advance cycle.

All of the grooves are identical in cross-section as shown in FIG. 24, comprising upper and lower inwardly sloping sides 7, respectively, and a flat bottom 8. The slope of the sides is the same as the slope of the teeth trailing edges 4 and the bottom is slightly wider, top-to-bottom, than the width of teeth flat ends 3. The depth of the grooves is such that a small clearance is provided between the groove bottoms 8 and the teeth flat ends 3 parallel thereto, and between groove sides and the teeth trailing edges 4 parallel thereto, such clearances being less than the differences in top-to-bottom width between the groove bottoms 8 and the teeth flat ends 3. Thus, movement of the front gate downward from the FIG. 25 position will cause the trailing edges of the back gate teeth to contact the adjacent upper sides of the front gate grooves to force the back gate rearward as the front gate back gate teeth ride out of their respective grooves. Likewise, movement of the front gate upward from the FIG. 27 position will cause the trailing edges of the front gate teeth to contact the adjacent upper sides of the back gate grooves to force the back gate rearward as the front gate and back gate teeth ride out of their respective grooves.

Figure 26:
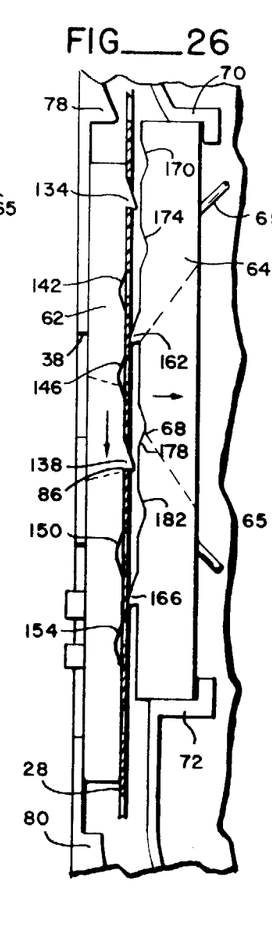
Figure 27:
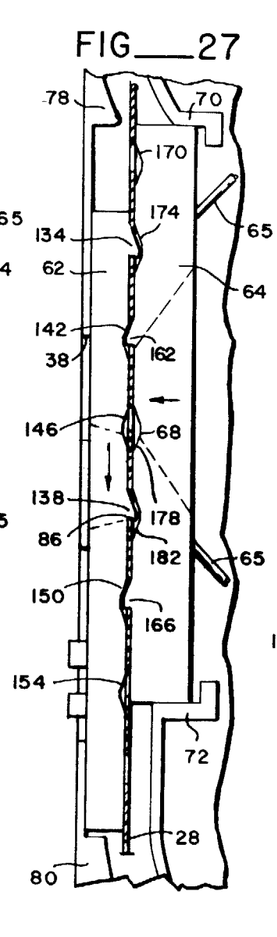
Figure 28:
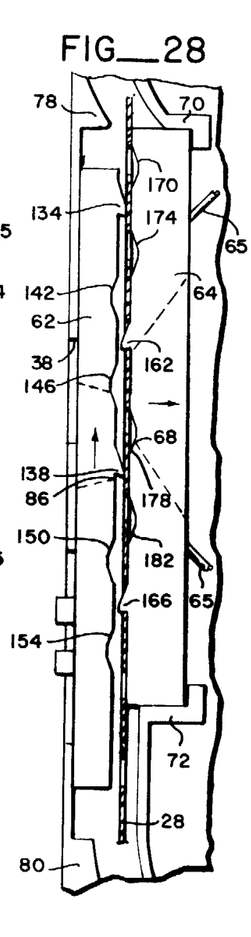

In both directions of front gate movement, it will be noted, the tips of the teeth leading edges do not contact the sides of the grooves and thus will not become worn or abraded as might be the case if such contact existed. Inasmuch as the teeth are identical in height, the film retaining teeth will clear the opposing gate by the thickness of the film during front gate transitional movement, as shown in FIGS. 26 and 28.

Two sets of teeth on each gate are preferred. Two sets on the gate that retains the film will ensure that the film is retained even if a splice reduces or eliminates the necessary film sprocket hole engagement of the leading edges of the teeth of one set. Two sets on the gate that does not retain the film ensure that the sliding contact between the teeth and the film will occur only between the film sprocket holes and not across the image frames.

Figures 14, 15:
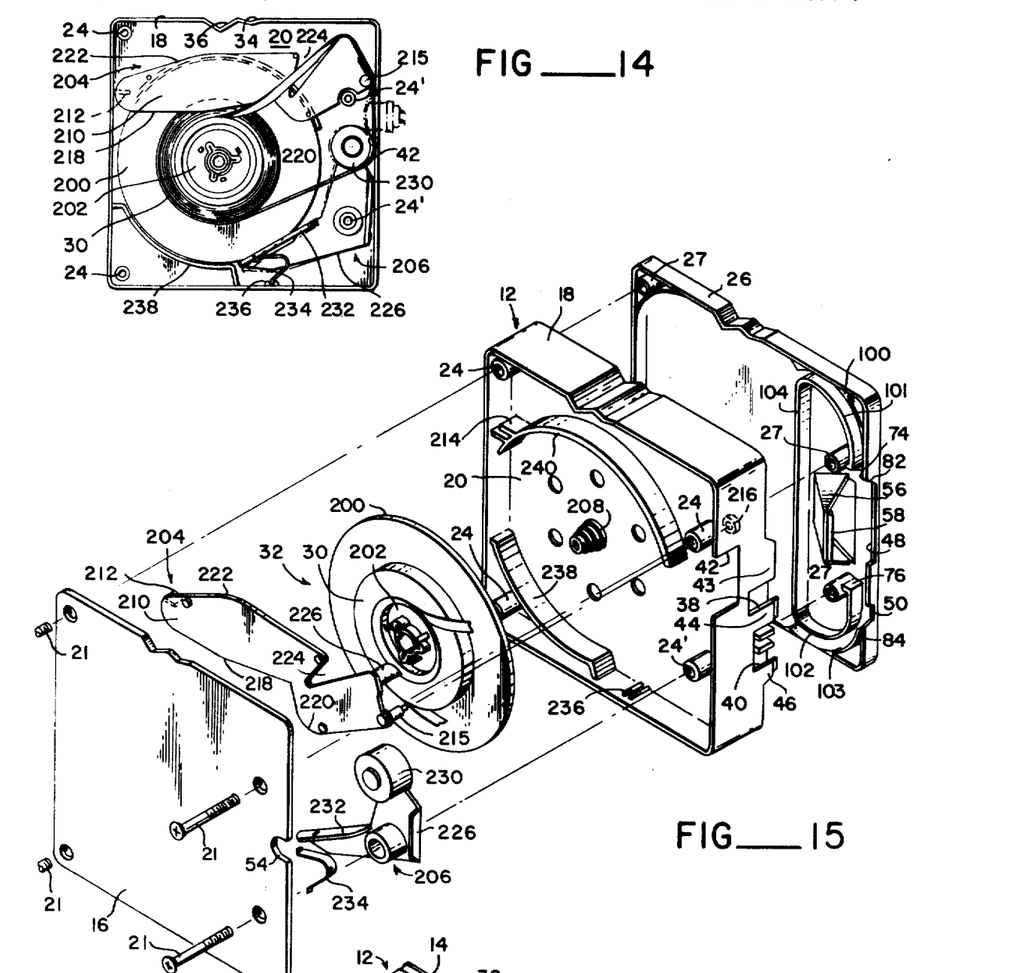
FIG. 14 is a perspective view of the tape side of the FIG. 11 cartridge.
FIG. 15 is an exploded assembly view of the tape side of the FIG. 14 cartridge as adapted for an endless spool-wound sound tape.
Figure 16:
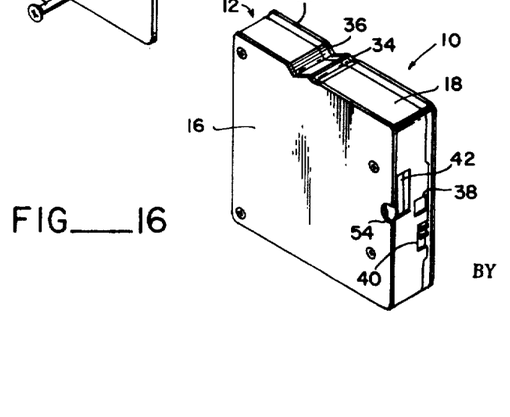
FIG. 16 is a plan view of the tape side of the FIGS. 14-15 cartridge with the tape-side cartridge cover removed.

The tape storage and dispensing assembly 32 comprises a flat circular disk 200 with an axial tape hub 202 rigidly mounted thereto, a tape guide 204 and a tape roller and disk assembly 206. The disk is axially mounted on a stub shaft 208 that protrudes from the web 20. Shaft 208 supports the disk outwardly from the web 20 so that the disk is freely rotatable. The tape 30 is wound around the hub 202 with the inner tape end pulled out from the hub and spliced to the outer tape end to form a continuous tape coil.

The tape guide 204 comprises a flat plate 210 of special geometry that overlays a segment of the circular disk 200 to help maintain the integrity of the tape coil and to help guide the tape out from the hub. The rearward end of the plate 120 is positioned by a tab 212 on its inner side that fits between two tabs 214 protruding from the web 20. The forward end of the plate 210 is positioned by a pin 215 on its inner side that fits into a boss 216 protruding from the web 20. The plate 210 has an edge 218 rounded in bull nose fashion that extends, from the rear, non-tangentially toward the rim of hub 202 and, from a point in close proximity to the hub rim, extends tangentially away from the hub rim toward the front of the cartridge to a rounded nose 220. The opposite edge 222 of the plate 210 is rounded in bull nose fashion and is provided with a V-notch 224, the apex of which is positioned adjacent to the terminum of the tangential section of edge 218 and the beginning of nose 220. A rounded guide leg 226 extends from the inner side of plate 210 to the web 20, such leg being positioned at the upper end of the forward side of V-notch 224.

The tape roller and disk assembly 206 comprises a lever 226 mounted rotatably against the web 20 on a spindle or boss 24' that protrudes from web 20, a roller 230 journal mounted to one leg of the lever 226 opposite and adjacent to the lower section of cartridge aperture 42, a pressure plate 232 in the form of a section of the other leg of lever 226 that is bent perpendicularly thereto and adapted to tangentially contact the edge of tape disk 200, and a compression spring clip 234 confined between tabs 236 on the bottom wall of side 18 and a slot in the pressure plate 232 to urge the pressure plate against the disk 200 to prevent the latter from rotating. This prevents the disk from rotating and entangling the tape when the cartridge is not in use.

Two semi-circular rims 238 and 240 protrude from the web 20 and are adapted to facilitate positioning the tape disk 200 therebetween and over the stub shaft 208. The tape-side cover 16 also is provided with a stub shaft 242 that telescopes over the end of stub shaft 208 to further ensure proper positioning of the tape disk 200.

The tape is run from the hub 202 up over the tangential section of edge 218, which turns it to a face-up position, across the face of plate 210, down through the V-notch 224, around the guide leg 226 which turns it back to its original edge-up position, and past pin 215 and around roller 230 back to the outer periphery of the tape coil. When the cartridge is inserted into a suitable projector, the projector capstan drive will contact the roller 230, with the tape pinched between the two, and push it rearward, thereby swinging the pressure plate 232 away from its braking position against the tape disk 200, as shown in FIG. 16 in phantom. Insertion of the cartridge into a suitable projector will also effect the insertion of a sound reproducing head through aperture 42 above the roller 230 and into contact with the tape, as also shown in phantom in FIG. 14. Thus, when the capstan drive rotates, the tape will be drawn from the hubside of the tape coil, past the sound head, between the capstan drive and roller 230, and wound back onto the outer periphery of the tape coil.

As can be ascertained from the foregoing description, assembly of the tape side of the cartridge is exceedingly simple, there being only four separate components (the tape disk 200, the plate 210, the lever 226 and the spring 234) in addition to the tape side cover 16 to assemble. Consequently, sound tapes-mounted on disks such as disk 200 can be quickly and easily mounted by one having little skill or training. This is an advantage not only in the original assembly of the cartridge but also when the cartridge user desires to interchange or replace sound tapes.

OPERATION OF THE SYSTEM

Because the system design is such that the cartridge is inserted along a linear path, defined by the chassis-mounted cartridge guideways, into its operable position, those chassis-mounted components that must interact with the cartridge can be quickly and accurately positioned during assembly of the projector. In the preferred projector described above, a jig may be employed in positioning these components as follows. The lower guideway channel 324 and the tape drive capstan 400 are mounted first. The jig is then inserted along the lower guideway until it abuts the capstan. Inasmuch as the jig will include positioning elements for the cartridge stops 328 and 332, the upper guideway channel 322, the sound head 412, the projection lens 420, and the actuating mechanism 370, all these elements can now be physically positioned against the jig. Thus, by the present arrangement, all of these projector-contained components are positioned relative to the tape drive capstan for proper orientation with respect to the projecting position to be assumed by the cartridge.

With these components properly assembled, the cartridge can be inserted along the guideways until the roller 334 engages the first notch 34 in the top wall of the cartridge at which point the cartridge is relatively-firmly held in the projector for transport out of engagement with the capstan 400, sound head 412 and actuating mechanism pin 382. When in this position, the cartridge-mounted tape roller 230 will not become deformed by the capstan 408 as might be the case of the two were left in stationary engagement over a period of time. When a presentation is to be made, the cartridge is inserted along the guideways until the roller 334 engages the second notch 36. This latter notch is deeper than the first notch 34 so that the cartridge will be held more firmly in the forward projecting position than it need be held in the stand-by position. When the cartridge is inserted into the projector, the position of front gate 62 should be such that its trigger is in its uppermost position for engagement with the actuating mechanism pin 382, the latter being in its uppermost position when not actuated. As the cartridge approaches the guideway stop, the actuating mechanism pin 382 will engage the trigger and be resiliently urged forward slightly against the action of spring 385.

With the cartridge in projecting condition, the system is turned on by depressing the "on" switch 482 at the rear of the projector. The tape drive draws the tape past the sound head 112 and the projection lamp sub-assembly turns on to project the film frame images. In accordance with the film advance signal pulses on one of the two tape tracks, the actuating mechanism 370 automatically reciprocates the front gate 62 to advance the film frame-by-frame past the cartridge aperture 38.

It is believed that the invention will have been clearly understood from the foregoing detailed description of my now-preferred illustrated embodiment.

For example, the film could be provided as on a spool in the same manner as the tape described above. Further, the tape could be provided in strip form in the same manner as the film strip described above.

As a further example, the front gate could be slidably mounted in the projector in such a manner as to couple with the cartridge-contained back gate when the cartridge is positioned for film projection. Although this variation would introduce problems associated with the need for greater cartridge and film alignment accuracy than is necessary in the preferred embodiment, the problems would not be as great as exist in known systems. Because of the design of the front gate, initial contact with the film as the cartridge is inserted to the projecting position would not damage the film. Once the cartridge was properly positioned with the front and back gates contacting opposite faces of the film, the advantages inherent in the structure and function of the front and back gates would still accrue to this variation.

The embodiments of the invention in which an exclusive property or privilege is claimed are defined as follows:

1. A film projection system which comprises a projector housing having an opening for receiving a projection cartridge; a projection cartridge adapted to be inserted through said opening along a linear path and containing multi-frame film and a sound tape, said cartridge including an image projection aperture, a sound head aperture, and a tape advancing aperture; means in said projector housing for projecting film images through the cartridge image projection aperture onto a projection screen including a projection light source to illuminate film images aligned with the cartridge image projection aperture and a projection lens to project illuminated film images onto a projection screen; actuating means for advancing the film; means for mounting said actuating means in said path for direct engagement with said cartridge for advancing the film when the cartridge is inserted along said path; said cartridge including film advance and image gating means engageable with said actuating means for guidingly advancing the film past the cartridge projection aperture, gating the film frames during advancement, and masking film frames aligned with the cartridge projection aperture; said film advance and imaging gating means comprising a longitudinally-movable first gate member having an image projecting aperture alignable with said cartridge image projection aperture and a second gate member having a light beam aperture aligned with said cartridge image projection aperture; the first and second gate members having cooperating adjacent surfaces adapted to contain film therebetween and to advance the film when said first gate member is moved so as to shift its image projecting aperture out of alignment with said cartridge image projection aperture.

2. The system of claim 1 including first guide means for said second gate member permitting lateral movement of said second gate member toward and away from said cartridge image projection aperture, second guide means for said first gate member permitting longitudinal movement of said first gate member parallel to said cartridge image projection aperture, spring means urging said second gate member toward said cartridge projection aperture, and third guide means for guiding film to and from said first and second gate members.

3. The system of claim 1 wherein said first and second gate members are each provided with co-operable film sprocket hole engaging teeth and grooves adapted to receive teeth of the other gate member; said teeth and grooves being so arranged that film is carried by said first gate member when said first gate member is moved so as to transfer its image projecting aperture out of alignment with said cartridge image projection aperture, and being so arranged that film is retained by said second gate member when said first gate member is moved so as to transfer its image projecting aperture into alignment with said cartridge projection aperture.

4. The system of claim 3 wherein each tooth is provided with a leading edge oriented in the direction of film and having a positive rake angle, and a trailing edge having a negative rake angle; and wherein the grooves are so designed that the trailing edges of the teeth, that are withdrawn from film sprocket holes during movement of said first gate member, contact the sides of grooves in the other gate member to urge said second gate member away from said cartridge image projection aperture.

5. A film projection system which comprises a projector housing having an opening for receiving a projection cartridge; a projection cartridge adapted to be inserted through said opening along a linear path and containing multi-frame film and a sound tape, said cartridge including an image projection aperture, a sound head aperture, and a tape advancing aperture; means in said projector housing for projecting film images through the cartridge image projection aperture onto a projection screen including a projection light source to illuminate film images aligned with the cartridge image projection aperture and a projection lens to project illuminated film images onto a projection screen; actuating means for advancing the film; means for mounting said actuating means in said path for direct engagement with said cartridge for advancing the film when the cartridge is inserted along said path; a sound reproducing head and a sound tape capstan for engaging the sound tape extending across the cartridge sound head and the tape advancing apertures; means for mounting said sound reproducing head and said sound tape capstan in said path and fixed against movement laterally of said path for direct engagement with said tape as said cartridge is inserted into said housing along said path, a tape storage and dispensing assembly comprising a disk rotatably mounted in said housing, an axial tape hub affixed to said disk and adapted to having an endless tape coil wound thereon with the tape extending out from the hub and returning to the outer periphery of the coil; a tape guide member overlaying a segment of said disk and adapted to guide the tape out from the hub and direct it toward said cartridge tape advancing and sound head apertures; and a tape roller and disk brake assembly comprising a lever member pivotally-connected to said housing and provided with a disk pressure plate, a roller journal-mounted to said lever and positioned by said lever adjacent to said cartridge tape drive and sound head apertures and adapted to have the tape extended therearound such that the tape extends past and adjacent to said cartridge tape drive and sound head apertures, and spring means urging said pressure plate against said disk to prevent said disk from rotating until an external tape drive element is drivingly engaged with said roller and the tape extended therearound.

6. The system of claim 5 wherein said tape guide member comprises a plate having a first edge with a section thereof extending tangentially from said hub in proximity to the point where the tape is drawn from said hub to facilitate withdrawal of the tape therefrom and to turn the tape to a face-up position, and having a second edge with a V-notch therein adapted to receive the tape as it extends across said plate; and comprises a guide leg positioned at the end of one side of the notch and adapted to turn the tape back to an edge-up position and to direct the tape toward said cartridge tape drive and sound head receiving apertures.

References Cited
UNITED STATES PATENTS

| | | | |
|---|---|---|---|
| 2,568,734 | 9/1951 | Heyer | 274—4 F |
| 3,025,750 | 3/1962 | Polan et al. | 242—55.19 A X |
| 3,227,508 | 1/1966 | Bavaro | 353—18 |
| 3,252,372 | 5/1966 | Galina | 353—15 |
| 3,300,270 | 1/1967 | Finnerty | 352—29 |
| 3,305,296 | 2/1967 | Nicosia | 352—78 |
| 3,311,316 | 3/1967 | Williams | 242—55.19 |
| 3,375,054 | 3/1968 | Hughes | 352—29 |
| 3,389,953 | 6/1968 | Gerry | 352—78 |

HARRY N. HAROIAN, Primary Examiner

U.S. Cl. X.R.

353—95